(12) United States Patent
Gerber

(10) Patent No.: US 11,053,346 B2
(45) Date of Patent: Jul. 6, 2021

(54) HARDENER FOR COLD HARDENING EPOXY RESIN ADHESIVES HAVING FAST HARDENING

(71) Applicant: SIKA TECHNOLOGY AG, Baar (CH)

(72) Inventor: Ulrich Gerber, Uitikon-Waldegg (CH)

(73) Assignee: SIKA TECHNOLOGY AG, Baar (CH)

( * ) Notice: Subject to any disclaimer, the term of this patent is extended or adjusted under 35 U.S.C. 154(b) by 7 days.

(21) Appl. No.: 16/469,908

(22) PCT Filed: Dec. 7, 2017

(86) PCT No.: PCT/EP2017/081904
§ 371 (c)(1),
(2) Date: Jun. 14, 2019

(87) PCT Pub. No.: WO2018/108706
PCT Pub. Date: Jun. 21, 2018

(65) Prior Publication Data
US 2019/0382524 A1 Dec. 19, 2019

(30) Foreign Application Priority Data

Dec. 14, 2016 (EP) .................................. 16204073

(51) Int. Cl.
| | | |
|---|---|---|
| *C08G 59/18* | (2006.01) | |
| *C08K 5/17* | (2006.01) | |
| *C08L 63/04* | (2006.01) | |
| *C09D 163/04* | (2006.01) | |
| *C09J 163/00* | (2006.01) | |

(52) U.S. Cl.
CPC .............. *C08G 59/184* (2013.01); *C08K 5/17* (2013.01); *C08L 63/04* (2013.01); *C09D 163/04* (2013.01); *C09J 163/00* (2013.01)

(58) Field of Classification Search
CPC ........ C08L 63/00–10; C09D 163/00–10; C09J 163/00–10; C08J 2363/00–10; C08G 59/184
See application file for complete search history.

(56) References Cited

U.S. PATENT DOCUMENTS

| | | | |
|---|---|---|---|
| 4,113,684 A * | 9/1978 | Petrie ................... | C08G 59/184 427/195 |
| 4,348,505 A | 9/1982 | Di Benedetto et al. | |
| 4,525,542 A | 6/1985 | DeGooyer | |
| 4,539,347 A | 9/1985 | DeGooyer | |
| 2017/0174881 A1* | 6/2017 | Kumar ................... | D06M 15/55 |
| 2020/0087552 A1* | 3/2020 | Gerber ................... | C04B 26/14 |

FOREIGN PATENT DOCUMENTS

WO 2014/186031 A1 11/2014

OTHER PUBLICATIONS

XP-002770226, Database WPI, Week 198018, Thomson Scientific, London, GB.
Feb. 8, 2018 International Search Report issued in International Patent Application No. PCT/EP2017/081904.
Jun. 18, 2019 International Preliminary Report on Patentability issued in International Patent Application No. PCT/EP2017/081904.

* cited by examiner

*Primary Examiner* — Kregg T Brooks
(74) *Attorney, Agent, or Firm* — Oliff PLC

(57) ABSTRACT

An adduct AD obtained from the reaction of at least one novolak glycidyl ether containing an average of 2.5 to 4 epoxy groups per molecule with an amine mixture including bis(6-aminohexyl)amine and at least one amine A1 other than bis(6-aminohexyl)amine that has at least one primary amino group. Preferably, the amine mixture is a technical grade quality of bis(6-aminohexyl)amine that contains 25% to 82% by weight of bis(6-aminohexyl)amine. The adduct AD is preparable in a simple manner and without the use of solvents, and enables low-odor, low-toxicity and low-viscosity hardeners that can be processed and stored even under cold conditions. Epoxy resin compositions cured therewith very rapidly build up high binding forces and high strengths under ambient outdoor temperatures, even on substrates that are difficult to bond.

19 Claims, No Drawings

HARDENER FOR COLD HARDENING EPOXY RESIN ADHESIVES HAVING FAST HARDENING

TECHNICAL FIELD

The invention relates to the field of amine-epoxy resin adducts, the hardeners for epoxy resins and the epoxy resin adhesives.

PRIOR ART

Room temperature curable epoxy resin adhesives are used for many applications. They typically have good stability, high strength and strong adhesion to different substrates. For applications in the construction industry, they have to be usable under construction site conditions; important features for this purpose are especially easy processability, and reliable and rapid curing at ambient outdoor temperatures, especially also under cold conditions and at high humidity or under wet conditions.

The prior art discloses epoxy resin adhesives in which what are called Mannich bases are used as a constituent of the hardener. However, these are complicated to prepare and typically have a high content of free phenols such as phenol, nonylphenol or p-tert-butylphenol, which is undesirable nowadays for reasons of toxicity.

Typical room temperature-curing epoxy resin adhesives that do not contain any free phenols cure slowly outdoors, particularly below 10° C. and that elevated humidity, build up strength only slowly and remain tacky for a long time. The final strength is often lower than at room temperature, and only inadequate adhesion is achieved on some substrates, especially concrete or steel.

The hardeners used in such adhesives contain a high proportion of low molecular weight amines which can be partially adducted with liquid resins, and optionally additionally tertiary amines or Mannich bases as accelerator. These hardeners are easy and inexpensive to prepare, but have some disadvantages. As a result of the high content of low molecular weight amines, they are odorous and require elevated occupational protection measures on processing. Moreover, they are prone to blushing, i.e. salt formation with carbon dioxide from the air, particularly under cold and moist conditions.

There is thus a need for novel hardeners for epoxy resins that are inexpensively preparable and have low odor and enable adhesives that can be processed easily even when used outdoors and at the same time cure rapidly and reliably to develop high strength and strong bonding forces.

U.S. Pat. No. 4,525,542 describes the reaction of novolak glycidyl ethers with polyamines to give adducts which, as intermediates, are adducted further with epoxides in situ and then used as hardener for epoxy resin compositions having good low-temperature curing.

U.S. Pat. No. 4,348,505 describes liquid adducts of polyepoxides having a functionality greater than 2, especially novolak glycidyl ethers, for protective coatings having a high solvent content that are cured at room temperature or under hot conditions and possess high chemical stability.

Novolak adducts are prepared in the prior art typically using solvents, which lowers the viscosity of the reaction mixture and prevents precipitation of the novolak resin. However, the adducts thus obtained are either solvent-containing and hence odorous and lead to emissions and shrinkage during and after curing, or they are costly to prepare owing to the complex removal of the solvent and can solidify in the course of storage, especially under cold conditions.

SUMMARY OF THE INVENTION

It is therefore an object of the invention to provide a hardener for epoxy resins which is inexpensively preparable and has low odor and low emissions and enables epoxy resin adhesives that are processable in a simple manner under ambient conditions, especially also at temperatures in the range from 0 to 10° C. and at high humidity, cure rapidly and at the same time develop strong adhesion to various substrates, especially concrete, steel and carbon fiber composites.

This object is surprisingly achieved by an adduct as described in claim 1. The adduct is free-flowing at room temperature and has primary amino groups. It is obtained by reaction of at least one novolak glycidyl ether having an average functionality in the range from 2.5 to 4 with an amine mixture comprising bis(6-aminohexyl)amine and at least one amine A1. The adduct can be prepared in a surprisingly simple and inexpensive manner without solvent or thinner. It enables low-odor and low-viscosity hardeners which, in spite of the high melting point of bis(6-aminohexyl)amine and the high functionality of novolak glycidyl ether, have a low solidification temperature and hence can be processed and stored even under cold conditions. These hardeners enable epoxy resin adhesives which build up high strength surprisingly rapidly at ambient temperatures, even under cold conditions, and simultaneously develop high bonding forces, even with humidity and on substrates that are difficult to bond. These two properties are generally contradictory; in other words, systems that build up strength quickly typically have a tendency to low bonding force and vice versa.

By comparison with an adduct derived from pure bis(6-aminohexyl)amine, i.e. without amine A1, the adduct described in claim 1 surprisingly enables epoxy resin adhesives having faster development of strength at room temperature and under cold conditions, higher final strength and in some cases also higher bonding forces.

By comparison with an adduct derived from triethylenetetramine rather than bis(6-aminohexyl)amine, the adduct described in claim 1 surprisingly enables epoxy resin adhesives having faster development of strength at room temperature and under cold conditions, a much higher final strength, higher bonding forces and a much lower level of curing defects on hardening at 5° C. and above 70% relative air humidity.

By comparison with an adduct derived from bisphenol A diglycidyl ether rather than novolak glycidyl ether, the adduct described in claim 1 surprisingly enables epoxy resin adhesives having much faster development of strength under cold conditions and a much higher final strength, these advantages being achieved only to a small degree through the use of some novolak glycidyl ether in the resin component of the adhesive.

Further aspects of the invention are the subject of further independent claims. Particularly preferred embodiments of the invention are the subject of the dependent claims.

Ways of Executing the Invention

The invention provides an adduct AD obtained from the reaction of at least one novolak glycidyl ether containing an average of 2.5 to 4 epoxy groups per molecule with an amine mixture comprising bis(6-aminohexyl)amine and at least one amine A1 other than bis(6-aminohexyl)amine that has at least one primary amino group.

Substance names beginning with "poly", such as polyamine, polyol or polyepoxide, refer to substances containing, in a formal sense, two or more of the functional groups that occur in their name per molecule.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

An "amine hydrogen" refers to the hydrogen atoms of primary and secondary amino groups.

An "amine hydrogen equivalent weight" refers to the mass of an amine or an amine-containing composition that contains one molar equivalent of amine hydrogen.

A "thinner" refers to a substance which is soluble in an epoxy resin and lowers its viscosity, and which is not covalently incorporated into the resin matrix in the curing of the epoxy resin.

"Viscosity" refers to the dynamic viscosity or shear viscosity which is defined by the ratio between the shear stress and the shear rate (speed gradient) and is determined as described in the working examples.

"Molecular weight" refers to the molar mass (in g/mol) of a molecule. "Average molecular weight" is the number average $M_n$ of a polydisperse mixture of oligomeric or polymeric molecules, which is typically determined by means of gel permeation chromatography (GPC) against polystyrene as standard.

"Room temperature" refers to a temperature of 23° C.

A suitable novolak glycidyl ether is derived from novolaks that are condensation products of phenols or cresols with formaldehyde or paraformaldehyde or acetaldehyde or crotonaldehyde or isobutyraldehyde or 2-ethylhexanal or benzaldehyde or furfural. Such a novolak glycidyl ether is typically liquid at room temperature, or very highly viscous up to barely free-flowing, or solid.

The novolak glycidyl ether is preferably a phenol novolak glycidyl ether. These are derived from phenol-formaldehyde novolaks, which are also referred to as epoxy-phenol novolak resins.

Phenol novolak glycidyl ethers are commercially available, for example from Olin, Huntsman, Momentive or Emerald Performance Materials. Preferred products are D.E.N.® 431, D.E.N.® 438 or D.E.N.® 439 (from Olin), Araldite® EPN 1179, Araldite® EPN 1180, Araldite® EPN 1182 or Araldite® EPN 1182 (from Huntsman), Epon® 154, Epon® 160 or Epon® 161 (from Momentive) or Epalloy® 8250, Epalloy® 8330 or Epalloy® 8350 (from Emerald Performance Materials).

The novolak glycidyl ether preferably contains an average of 2.5 to 3.9 epoxy groups per molecule. It thus preferably has an average functionality in the range from 2.5 to 3.9.

For the conversion to the adduct AD, an amine mixture comprising bis(6-aminohexyl)amine and at least one amine A1 other than bis(6-aminohexyl)amine that has at least one primary amino group is used.

In the amine mixture, the content of bis(6-aminohexyl)amine is preferably at least 25% by weight, especially at least 50% by weight. In the amine mixture, the content of amines A1 is preferably at least 15% by weight, especially at least 20% by weight.

More preferably, the amine mixture contains 25% to 82% by weight, especially 50% to 78% by weight, of bis(6-aminohexyl)amine and 15% to 75% by weight, especially 20% to 50% by weight, of amines A1.

Preferably, the amine mixture is a technical grade quality of bis(6-aminohexyl)amine. Suitable technical grade qualities of bis(6-aminohexyl)amine are obtained as by-products from the preparation of hexamethylene-1,6-diamine and are commercially available, for example from Invista or from Solvay. As well as bis(6-aminohexyl)amine, they typically contain hexamethylene-1,6-diamine, higher oligomers of hexamethylene-1,6-diamine, 6-aminocapronitrile, 6-aminocaproamide, caprolactam and/or water.

The amine A1 is thus preferably selected from the group consisting of hexamethylene-1,6-diamine, higher oligomers of hexamethylene-1,6-diamine, 6-aminocapronitrile and 6-aminocaproamide.

"Higher oligomers of hexamethylene-1,6-diamine" refer here to oligomers having three or more hexamethylene-1,6-diamine units.

Most preferably, the amine mixture is a technical grade quality of bis(6-aminohexyl)amine containing 25% to 82% by weight, especially 50% to 78% by weight, of bis(6-aminohexyl)amine, especially commercially available Dytek® BHMT Amine (50-78%) from Invista or Rhodiamine® BHT from Solvay.

The use of a technical grade quality of bis(6-aminohexyl)amine as amine mixture leads to a particularly inexpensive adduct AD having a particularly low tendency to solidify, which enables hardeners having good storage stability at low temperatures. Such an adduct AD surprisingly leads to epoxy resin compositions having particularly high strengths and bonding forces.

The adduct AD is especially obtained from the reaction of the novolak glycidyl ether with a stoichiometric excess of amines.

More particularly, the primary amino groups of the amine mixture are in a stoichiometric excess over the epoxy groups of the novolak glycidyl ether in the reaction to give the adduct.

In the reaction to give the adduct, the ratio between the number of primary amino groups present and the number of epoxy groups present is preferably at least 3, especially at least 4.

Preferably, the ratio between the number of primary amino groups present and the number of epoxy groups present in the reaction to give the adduct is in the range from 3 to 12, more preferably 4 to 8, especially 4 to 6. In this way, an adduct having manageable viscosity which is free-flowing at room temperature is obtained, which has primary and secondary amino groups and a high content of structural units originating from the novolak glycidyl ether.

After the preparation, unconverted amine can be partly removed, especially by means of distillation. Preference is given to not removing unconverted amine from the adduct.

Preferably, the adduct AD has a viscosity at 25° C. of less than 100 Pa·s, more preferably less than 50 Pa·s, especially less than 30 Pa·s.

Preferably, the temperature in the reaction to give the adduct is in the range from 50 to 140° C., more preferably 60 to 140° C., especially 70 to 120° C. The temperature is suitably kept within the range specified until the epoxy groups have been converted for the most part.

The reaction can optionally be effected in the presence of a thinner, where thinners also refer to what are called solvents. The reaction is preferably effected without the use of a thinner. In this way, hardeners for epoxy resins that are free of thinners are obtainable in a simple manner.

More preferably, the adduct AD is prepared by initially charging the amine mixture and mixing in the novolak glycidyl ether, where the reaction is conducted at a temperature in the range from 60 to 140° C., especially 70 to 120° C., and without solvent or thinner.

More particularly, the amine mixture is initially charged and heated up to a temperature in the range from 60 to 100° C., and then the novolak glycidyl ether is added gradually to the amine mixture while stirring at a temperature in the range from 20 to 140° C., especially 40 to 120° C., while keeping the temperature of the reaction mixture within the range from 60 to 140° C., especially 70 to 120° C., by cooling and/or gradually metering in the novolak glycidyl ether, until the majority of the epoxy groups have reacted.

The resultant adduct AD is typically a mixture comprising
  simple adducts in which each structural unit derived from bis(6-aminohexyl)amine or amines A1 is in each case only in singly alkylated or adducted form,
  higher adducts in which each structural unit derived from bis(6-aminohexyl)amine or amines A1 is in each case in at least doubly alkylated or adducted form, and
  free bis(6-aminohexyl)amine and free amine A1.

A typical simple adduct having a structural unit derived from a phenol novolak glycidyl ether having 3 epoxy groups per molecule and structural units derived from bis(6-aminohexyl)amine has the following formula:

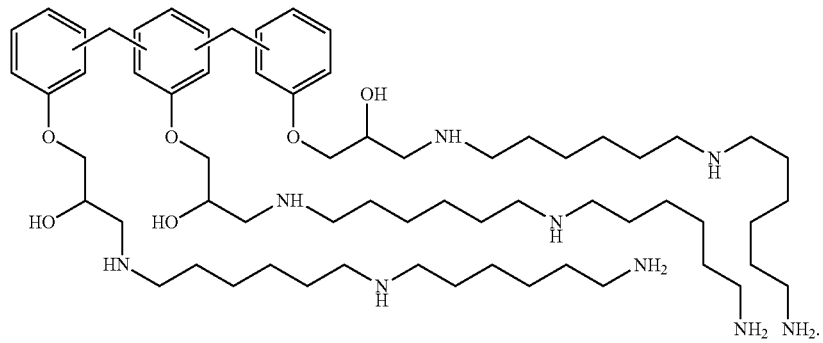

undecane-1,11-diamine, dodecane-1,12-diamine, diethylenetriamine (DETA), triethylenetetramine (TETA), tetraethylenepentamine (TEPA), pentaethylenehexamine (PEHA), hexaethyleneheptamine (HEHA), dipropylenetriamine (DPTA), N-(2-aminoethyl)propane-1,3-diamine (N3 amine), N,N'-bis(3-aminopropyl)ethylenediamine (N4 amine), N,N'-bis(3-aminopropyl)-1,4-diaminobutane, N5-(3-aminopropyl)-2-methylpentane-1,5-diamine, N3-(3-aminopentyl)pentane-1,3-diamine, N5-(3-amino-1-ethylpropyl)-2-methylpentane-1,5-diamine, N,N'-bis(3-amino-1-ethylpropyl)-2-methylpentane-1,5-diamine, 1,2-, 1,3- or 1,4-diaminocyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 1-amino-3-aminomethyl-3,5,5-trimethylcyclohexane (isophoronediamine or IPDA), 2- or 4-methyl-1,3-diaminocyclohexane or mixtures thereof, 1,3-bis(aminomethyl)cyclohexane, 1,4-bis(aminomethyl)cyclohexane, 2,5(2,6)-bis(aminomethyl)bicyclo[2.2.1]heptane (NBDA), 3(4),8(9)-bis(aminomethyl)tricyclo[5.2.1.0$^{2,6}$]decane, 1,4-diamino-2,2,6-trimethylcyclohexane (TMCDA), menthane-1,8-diamine, 3,9-bis(3-aminopropyl)-2,4,8,10-tetraoxaspiro[5.5]undecane, 1,3-bis(aminomethyl)benzene (MXDA), 1,4-bis(aminomethyl)benzene, 2,5-bis(aminomethyl)furan or 2,5-bis(aminomethyl)tetrahydrofuran;

The invention further provides a hardener for epoxy resins comprising the above-described adduct AD and at least one further amine A2 other than bis(6-aminohexyl)amine that has at least two and especially at least three amine hydrogens reactive toward epoxy groups per molecule.

The amine A2 is preferably not in a technical grade quality of bis(6-aminohexyl)amine.

Such a hardener is of low viscosity and is particularly stable to crystallization under cold conditions.

Suitable amines A2 are especially the following polyamines:
  aliphatic, cycloaliphatic or arylaliphatic primary diamines, especially pentane-1,3-diamine (DAMP), pentane-1,5-diamine, 1,5-diamino-2-methylpentane (MPMD), 2-butyl-2-ethylpentane-1,5-diamine (C11 neodiamine), hexane-1,6-diamine, 2,5-dimethylhexane-1,6-diamine, 2,2(4),4-trimethylhexamethylenediamine (TMD), heptane-1,7-diamine, octane-1,8-diamine, nonane-1,9-diamine, decane-1,10-diamine,
  aliphatic, cycloaliphatic or arylaliphatic primary triamines, especially 4-aminomethyloctane-1,8-diamine, 1,3,5-tris(aminomethyl)benzene, 1,3,5-tris(aminomethyl)cyclohexane, tris(2-aminoethyl)amine, tris(2-aminopropyl)amine, tris(3-aminopropyl)amine or N,N-bis(2-aminoethyl)-N-(5-amino-3-azapentyl)amine;
  aliphatic primary di- or triamines containing ether groups, especially bis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine or higher oligomers of these diamines, bis(3-aminopropyl)polytetrahydrofurans or other polytetrahydrofurandiamines, diamines containing cycloaliphatic ether groups from the propoxylation and subsequent amination of 1,4-dimethylolcyclohexane, especially obtainable as Jeffamine® RFD-270 (from Huntsman), or polyoxyalkylenedi- or -triamines that are typically products from the amination of polyoxyalkylenedi- or -triols and are obtainable, for example, under the Jeffamine® trade name (from Huntsman), under the Polyetheramine trade name (from BASF) or under the PC Amine® trade name (from Nitroil). Especially suitable polyoxyalkylenedi- or -triamines are Jeffamine® D-230, Jeffamine® D-400, Jeffamine® D-205, Jeffamine® EDR-104, Jeffamine® EDR-148, Jeffamine® EDR-176, Jeffamine® T-403, corresponding amines from BASF or Nitroil;

polyamines having one or two secondary amino groups, especially products from the reductive alkylation of primary aliphatic polyamines with aldehydes or ketones, especially N-benzyl-1,3-bis(aminomethyl) benzene, N,N'-dibenzyl-1,3-bis(aminomethyl)benzene, N-benzylpropane-1,2-diamine, N-benzylethane-1,2-diamine, or partially styrenized polyamines, for example styrenized MXDA (available as Gaskamine® 240 from Mitsubishi Gas Chemical);

polyamines with primary amino groups that have tertiary amino groups, such as, in particular, N,N-dimethylpropane-1,3-diamine, N,N-diethylpropane-1,3-diamine, N,N-dimethyl-1,2-ethandiamin, N,N-diethylethane-1,2-diamine, 2-(N,N-diethylamino)ethylamine, 1-(N,N-diethylamino)-4-aminopentane, 3-(3-(dimethylamino)propylamino)propylamine (DMAPAPA), 2-(2-(dimethylamino)ethylamino)ethylamine, 2-(3-(dimethylamino)propylamino)ethylamine, 3-(2-(dimethylamino)ethylamino)propylamine, 2-(2-(diethylamino)ethylamino)ethylamine, N-aminoethylpiperazine, N-aminopropylpiperazine, N,N'-bis(aminopropyl)piperazine, N,N-bis(3-aminopropyl)methylamine, N,N-bis(3-aminopropyl)ethylamine, N,N-bis(3-aminopropyl)propylamine, N,N-bis(3-aminopropyl)cyclohexylamine, N,N-bis(3-aminopropyl)-2-ethylhexylamine or products from the double cyanoethylation and subsequent reduction of fatty amines derived from natural fatty acids, especially N,N-bis(3-aminopropyl)dodecylamine or N,N-bis(3-aminopropyl)tallowalkylamine, available as Triameen® Y12D or Triameen® YT (from Akzo Nobel).

Among these, preference is given to MPMD, TMD, DETA, TETA, TEPA, PEHA, HEHA, DPTA, N3 amine, N4 amine, 1,2-diaminocyclohexane, bis(4-aminocyclohexyl) methane, IPDA, 2- or 4-methyl-1,3-diaminocyclohexane or mixtures thereof, 1,3-bis(aminomethyl)cyclohexane, 1,4-bis (aminomethyl)cyclohexane, NBDA, MXDA, polyoxyalkylenedi- or -triamines having an average molecular weight in the range from 200 to 500 g/mol, N,N-dimethylpropane-1,3-diamine, 3-(3-(dimethylamino)propylamino)propylamine (DMAPAPA) or mixtures of two or more of these amines. These amines are readily available and enable low-viscosity hardeners having high reactivity. The hardener preferably has a viscosity at 25° C. in the range from 0.1 to 5 Pa·s, more preferably 0.1 to 3 Pa·s, especially 0.2 to 1.5 Pa·s.

More preferably, the amine A2 is selected from the group consisting of TMD, TETA, TEPA, PEHA, HEHA, N4 amine, IPDA, 1,3-bis(aminomethyl)cyclohexane, 1,4-bis (aminomethyl)cyclohexane, MXDA, polyoxyalkylenedi- and -triamines having an average molecular weight in the range from 200 to 500 g/mol and DMAPAPA. Such a hardener has low odor and low viscosity and enables high strengths.

Among these, in one embodiment, preference is given to TETA, TEPA, PEHA, HEHA or N4 amine. Such a hardener enables particularly rapid curing. Among these, in a further embodiment, preference is given to a polyoxyalkylenediamine or -triamine having an average molecular weight in the range from 200 to 500 g/mol, especially Jeffamine® D-230, Jeffamine® D-400 or Jeffamine® T-403 (from Huntsman). Such a hardener enables particularly high extensibility.

A very particularly preferred amine A2 is DMAPAPA. Such a hardener is of particularly low viscosity, is particularly stable to crystallization under cold conditions, and enables particularly high compressive strengths and particularly high bonding forces.

The hardener may contain a combination of two or more amines A2. In this case, preferably at least one of these is selected from the abovementioned group. In particular, at least one of these is DMAPAPA.

Preferably, the amine A2 is not adducted with the novolak glycidyl ether. The amine A2 was thus preferably not present in the preparation of the adduct AD. Such a hardener has a particularly low crystallization temperature.

In addition, the hardener may contain further compounds reactive toward epoxides, especially the following:

primary monoamines such as, in particular, hexylamine, benzylamine or furfurylamine;

aromatic polyamines such as, in particular, m- and p-phenylenediamine, 4,4'-, 2,4'- and/or 2,2'-diaminodiphenylmethane, 3,3'-dichloro-4,4'-diaminodiphenylmethane (MOCA), tolylene-2,4- and/or -2,6-diamine, mixtures of 3,5-dimethylthiotolylene-2,4- and -2,6-diamine (available as Ethacure® 300 from Albemarle), mixtures of 3,5-diethyltolylene-2,4- and -2,6-diamine (DETDA), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diaminodiphenylsulfone (DDS), 4-amino-N-(4-aminophenyl)benzenesulfonamide, 5,5'-methylenedianthranilic acid, dimethyl 5,5'-methylenedianthranilate, propylene 1,3-bis(4-aminobenzoate), butylene 1,4-bis(4-aminobenzoate), polytetramethylene oxide bis(4-aminobenzoate) (available as Versalink® from Air Products), 1,2-bis(2-aminophenylthio)ethane, 2-methylpropyl 4-chloro-3,5-diaminobenzoate or tert-butyl (4-chloro-3,5-diaminobenzoate);

further adducts of polyamines with epoxides or epoxy resins, especially adducts of bis(6-aminohexyl)amine or the amines A2 mentioned with dipropylene glycol diglycidyl ethers or polypropylene glycol diglycidyl ethers, or adducts of MXDA and/or IPDA with diepoxides, such as, in particular, bisphenol A diglycidyl ether and/or bisphenol F diglycidyl ethers, or adducts of MPMD or propylene-1,2-diamine with monoepoxides, such as, in particular, cresyl glycidyl ether in a molar ratio of about 1:1, or reaction products of amines and epichlorohydrin, especially that of 1,3-bis(aminomethyl)benzene, commercially available as Gaskamine® 328 (from Mitsubishi Gas Chemical);

polyamidoamines, especially reaction products of a mono- or polybasic carboxylic acid, or the esters or anhydrides thereof, especially a dimer fatty acid, with an aliphatic, cycloaliphatic or aromatic polyamine used in a stoichiometric excess, especially a polyalkyleneamine, for example DETA or TETA, especially the commercially available polyamidoamines Versamid® 100, 125, 140 or 150 (from Cognis), Aradur® 223, 250 or 848 (from Huntsman), Euretek® 3607 or 530 (from Huntsman) or Beckopox® EH 651, EH 654, EH 655, EH 661 or EH 663 (from Cytec); or Mannich bases obtained from the reaction of phenols with aldehydes, especially formaldehyde, and aliphatic or cycloaliphatic amines, especially phenalkamines, i.e., Mannich bases of cardanol (long-chain alk(en)ylphenols and -resorcinols obtained by thermal treatment of cashewnutshell oil extracts, containing as main component 3-(pentadeca-8,11,14-trienyl)phenol, more particularly the commercial products Cardolite® NX-5607 or NX-5608 (from Cardolite), or Aradur® 3440, 3441, 3442 or 3460 (from Huntsman), or Beckopox® EH 614, EH 621, EH 624, EH 628 or EH 629 (from Cytec);

liquid mercaptan-terminated polysulfide polymers, known by the Thiokol® trade name (from Morton Thiokol; available, for example, from SPI Supplies, or from Toray Fine Chemicals), especially the LP-3, LP-33, LP-980, LP-23, LP-55, LP-56, LP-12, LP-31, LP-32 or LP-2 products; and also known by the Thioplast® brand name (from Akzo Nobel), especially the G 10, G 112, G 131, G 1, G 12, G 21, G 22, G 44 or G 4 products;

mercaptan-terminated polyoxyalkylene derivatives, obtainable, for example, by reaction of polyoxyalkylenedi- or -triols either with epichlorohydrin or with an alkylene oxide, followed by sodium hydrogensulfide, commercially available, for example, as Gabepro® GPM-800 (from Gabriel Performance Products) or under the Capcure® brand name (from Cognis), especially the WR-8, LOF or 3-800 products;

polyesters of thiocarboxylic acids, for example pentaerythritol tetramercaptoacetate, trimethylolpropane trimercaptoacetate, glycol dimercaptoacetate, pentaerythritol tetra(3-mercaptopropionate), trimethylolpropane tri(3-mercaptopropionate) or glycol di(3-mercaptopropionate), or esterification products of polyoxyalkylenediols or -triols, ethoxylated trimethylolpropane or polyester diols with thiocarboxylic acids such as thioglycolic acid or 2- or 3-mercaptopropionic acid; or further compounds having mercapto groups, such as, in particular, 2,4,6-trimercapto-1,3,5-triazine, 2,2'-(ethylenedioxy)diethanethiol (triethylene glycol dimercaptan) or ethanedithiol.

Preferably, the hardener has a content of adduct AD in the range from 20% to 80% by weight, especially 30% to 80% by weight, based on the compounds reactive with epoxy groups that are present in the hardener.

Preferably, the hardener has a content of amines A2 in the range from 10% to 70% by weight, especially 15% to 60% by weight, based on the compounds reactive with epoxy groups that are present in the hardener.

More preferably, the hardener has a content of DMAPAPA in the range from 5% to 60% by weight, especially 5% to 50% by weight, based on the compounds reactive with epoxy groups that are present in the hardener component.

A particularly preferred hardener contains
30% to 80% by weight of adduct AD,
5% to 60% by weight of DMAPAPA, and
0% to 40% by weight of further amines,
based on the compounds reactive with epoxy groups that are present in the hardener.

The hardener may also contain at least one accelerator. Suitable accelerators are substances which accelerate the reaction between amino groups and epoxy groups, especially acids or compounds hydrolyzable to acids, especially organic carboxylic acids such as acetic acid, benzoic acid, salicylic acid, 2-nitrobenzoic acid, lactic acid, organic sulfonic acids such as methanesulfonic acid, p-toluenesulfonic acid, sulfosalicylic acid or 4-dodecylbenzenesulfonic acid, sulfonic esters, other organic or inorganic acids such as, in particular, phosphoric acid, or mixtures of the aforementioned acids and acid esters; tertiary amines such as, in particular, 1,4-diazabicyclo[2.2.2]octane, benzyldimethylamine, α-methylbenzyldimethylamine, N,N,N',N'-tetramethylethane-1,2-diamine, N,N,N',N'-tetramethylpropane-1,3-diamine, N,N,N',N'-tetramethylbutane-1,4-diamine, N,N,N',N'-tetramethylhexane-1,6-diamine, N,N,N',N',N"-pentamethyldiethylenetriamine, N,N,N',N',N"-pentamethyldipropylenetriamine, bis(2-(N,N-dimethylamino)ethyl)amine, bis(3-(N,N-dimethylamino)propyl)amine, triethanolamine, triisopropanolamine, N,N-dimethylethanolamine, 3-(N,N-dimethylamino)propan-1-ol, imidazoles such as, in particular, N-methylimidazole, N-vinylimidazole or 1,2-dimethylimidazole, salts of such tertiary amines, quaternary ammonium salts, such as, in particular, benzyltrimethylammonium chloride, amidines such as, in particular, 1,8-diazabicyclo[5.4.0]undec-7-ene, guanidines such as, in particular, 1,1,3,3-tetramethylguanidine, phenols, especially bisphenols, phenolic resins or Mannich bases such as, in particular, 2-(dimethylaminomethyl)phenol, 2,4,6-tris(dimethylaminomethyl)phenol or polymers of phenol, formaldehyde and N, N-dimethylpropane-1,3-diamine, especially 2,4,6-tris(N, N-dimethyl-4-amino-2-azabutyl) phenol, phosphites such as, in particular, di- or triphenyl phosphites, or compounds having mercapto groups. Preferred accelerators are acids, tertiary amines or Mannich bases.

Most preferred is salicylic acid or 2,4,6-tris(dimethylaminomethyl)phenol or 2,4,6-tris(N,N-dimethyl-4-amino-2-azabutyl)phenol or a combination thereof. The hardener may further contain at least one thinner, especially xylene, 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol monomethyl ether, diethylene glycol monoethyl ether, diethylene glycol mono-n-butyl ether, diethylene glycol dimethyl ether, diethylene glycol diethyl ether, diethylene glycol di-n-butyl ether, propylene glycol butyl ether, propylene glycol phenyl ether, dipropylene glycol, dipropylene glycol monomethyl ether, dipropylene glycol dimethyl ether, dipropylene glycol di-n-butyl ether, N-methylpyrrolidone, diphenylmethane, diisopropylnaphthalene, mineral oil fractions, for example Solvesso® products (from Exxon), alkylphenols such as tert-butylphenol, nonylphenol, dodecylphenol or cardanol (from cashewnutshell oil, containing, as main constituent, 3-(8,11,14-pentadecatrienyl)phenol, available, for example, as Cardolite NC-700 from Cardolite Corp., USA), styrenized phenol, bisphenols, aromatic hydrocarbon resins, especially types containing phenol groups, alkoxylated phenol, especially ethoxylated or propoxylated phenol, especially 2-phenoxyethanol, adipates, sebacates, phthalates, benzoates, organic phosphoric or sulfonic esters or sulfonamides.

The hardener preferably contains only a small content of thinners, if any. The hardener preferably contains not more than 25% by weight, more preferably not more than 10% by weight, especially not more than 5% by weight, of thinner.

The hardener is especially free of thinners. Such a hardener is particularly suitable for low-emission or emission-free epoxy resin products.

The hardener is preferably largely free of amines having a molecular weight below 120 g/mol. It preferably contains less than 2% by weight, especially less than 1% by weight, of amines having a molecular weight below 120 g/mol. A hardener of this kind has particularly low odor.

The invention further provides an epoxy resin composition comprising
a resin component comprising at least one epoxy resin and a hardener component comprising the described reactant AD.

Suitable epoxy resins are standard industrial epoxy resins. These are obtained in a known manner, for example from the oxidation of the corresponding olefins or from the reaction of epichlorohydrin with the corresponding polyols, polyphenols or amines.

Particularly suitable epoxy resins are what are called liquid polyepoxide resins, referred to as "liquid resin" hereinafter. These have a solidification temperature below 25° C.

Likewise possible as epoxy resins are what are called solid resins which have a solidification temperature above 25° C. and can be comminuted to powders that are pourable at 25° C.

Suitable epoxy resins are especially aromatic epoxy resins, especially the glycidylization products of:
bisphenol A, bisphenol F or bisphenol A/F, where A stands for acetone and F for formaldehyde, which served as reactants for preparation of these bisphenols. In the case of bisphenol F, positional isomers may also be present, especially derived from 2,4'- or 2,2'-hydroxyphenylmethane.
dihydroxybenzene derivatives such as resorcinol, hydroquinone or catechol;
further bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z), 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxydiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl) ether or bis(4-hydroxyphenyl) sulfone;
condensation products of phenols with formaldehyde that are obtained under acidic conditions, such as phenol novolaks or cresol novolaks, also called epoxy novolak resins or novolak glycidyl ethers;
aromatic amines such as aniline, toluidine, 4-aminophenol, 4,4'-methylenediphenyldiamine, 4,4'-methylenediphenyldi(N-methyl)amine, 4,4'-[1,4-phenylenebis(1-methylethylidene)]bisaniline (bisaniline P) or 4,4'-[1,3-phenylenebis(1-methylethylidene)]bisaniline (bisaniline M).

Further suitable epoxy resins are aliphatic or cycloaliphatic polyepoxides, especially
glycidyl ethers of saturated or unsaturated, branched or unbranched, cyclic or open-chain di-, tri- or tetrafunctional $C_2$ to $C_{30}$ alcohols, especially ethylene glycol, propylene glycol, butylene glycol, hexanediol, octanediol, polypropylene glycols, dimethylolcyclohexane, neopentyl glycol, dibromoneopentyl glycol, castor oil, trimethylolpropane, trimethylolethane, pentaerythritol, sorbitol or glycerol, or alkoxylated glycerol or alkoxylated trimethylolpropane;
hydrogenated bisphenol A, F or A/F liquid resins, or glycidylization products of hydrogenated bisphenol A, F or A/F;
N-glycidyl derivatives of amides or heterocyclic nitrogen bases, such as triglycidyl cyanurate or triglycidyl isocyanurate, or reaction products of epichlorohydrin with hydantoin.
epoxy resins from the oxidation of olefins such as, in particular, vinylcyclohexene, dicyclopentadiene, cyclohexadiene, cyclododecadiene, cyclododecatriene, isoprene, 1,5-hexadiene, butadiene, polybutadiene or divinylbenzene.

A preferred epoxy resin in the resin component is preferably a liquid resin based on a bisphenol, especially a diglycidyl ether of bisphenol A, bisphenol F or bisphenol A/F, as commercially available, for example, from Dow, Olin, Huntsman or Momentive. These liquid resins have a low viscosity for epoxy resins and good properties in the cured state as a coating. They may contain proportions of solid bisphenol A resin or novolak glycidyl ethers.

The resin component may comprise a reactive diluent, especially a reactive diluent having at least one epoxy group. Suitable reactive diluents are especially the glycidyl ethers of mono- or polyhydric phenols or aliphatic or cycloaliphatic alcohols, such as, in particular, the polyglycidyl ethers of di- or polyols that have already been mentioned, especially butane-1,4-diol diglycidyl ether, hexane-1,6-diol diglycidyl ether or glycidyl ethers of glycerol, polyglycerol or trimethylolpropane, or phenyl glycidyl ether, cresyl glycidyl ether, guaiacol glycidyl ether, 4-methoxyphenyl glycidyl ether, p-n-butylphenyl glycidyl ether, p-tert-butylphenyl glycidyl ether, 4-nonylphenyl glycidyl ether, 4-dodecylphenyl glycidyl ether, cardanol glycidyl ether, benzyl glycidyl ether, allyl glycidyl ether, butyl glycidyl ether, hexyl glycidyl ether, 2-ethylhexyl glycidyl ether, or glycidyl ethers of natural alcohols, such as, in particular, $C_8$- to $C_{10}$-alkyl glycidyl ethers or $C_{12}$- to $C_{14}$-alkyl glycidyl ethers.

Preferably, the resin component comprises at least one reactive diluent, especially a diglycidyl ether. Such a reactive diluent improves processability without too severe an impact on strength.

The hardener component preferably comprises the above-described hardener. The hardener component optionally comprises further additions, such as, in particular, fillers, pigments, fibers, stabilizers and/or surface-active substances.

The epoxy resin composition may comprise additional constituents, where these may be present as a constituent of the resin component and/or of the hardener component and/or as a separate component. Constituents reactive toward epoxy groups are preferably part of the hardener component; constituents reactive toward amino groups are preferably part of the resin component.

Preferably, the epoxy resin composition contains at least one thixotropic agent. Suitable thixotropic agents are especially fumed silicas. Particularly suitable thixotropic agents are those that build up the thixotropy only by virtue of the mixing of the components ("in situ"). Preferred in situ thixotropic agents are combinations of fumed silicas with glycols and/or polyethyleneimines, where the fumed silica is present in the first component and the glycol or polyethyleneimine in the second component. Preferred fumed silicas are unmodified (hydrophilic) types. Preferred glycols are polyethylene glycols. Preferred polyethyleneimines are polyethyleneimines having an average molecular weight in the range from 800 to 2'000'000, especially 2000 to 750'000, more preferably 5000 to 100'000, g/mol, as commercially available in undiluted form or as an aqueous solution, for example under the Lupasol® brand name (from BASF) or Epomin® (from Nippon Shokubai). Likewise suitable are combinations of silicas with additives such as, in particular, BYK®-R 605, BYK®-R 607 or BYK®-R 608 (all from BYK Additives and Instruments). Particular preference is given to combinations of unmodified fumed silica, especially the Aerosil® 200 (from Evonik Industries), HDK® N20 (from Wacker Chemie), CAB-O-SIL® M-5 (from Cabot) or REOLOSIL® QS-102 (from Akpa Kimya) products, with polyethyleneimines, especially the Lupasol® WF, Lupasol® HF (all from BASF) or Epomin® SP-200 (from Nippon Shokubai) products.

The epoxy resin composition preferably additionally comprises at least one inorganic filler. A suitable inorganic filler is especially ground or precipitated calcium carbonate which has optionally been coated with fatty acid, especially stearates, baryte (heavy spar), talc, quartz flour, quartz sand, silicon carbide, iron mica, dolomite, wollastonite, kaolin, mica (potassium aluminosilicate), molecular sieve, aluminum oxide, aluminum hydroxide, magnesium hydroxide, silica, cement, gypsum, fly ash. Preferred inorganic fillers are silicatic fillers, especially quartz flour, quartz sand, silicon carbide, wollastonite or mica.

The epoxy resin composition optionally contains further ingredients, especially selected from the following auxiliaries and additives:

thinners, especially those already mentioned;
accelerators, especially those already mentioned;
fibers, especially glass fibers, carbon fibers, metal fibers, ceramic fibers or polymer fibers such as polyamide fibers or polyethylene fibers;
pigments, especially titanium dioxide, iron oxides or chromium(III) oxide;
rheology modifiers, especially thickeners and antisettling agents;
adhesion improvers, especially organoalkoxysilanes;
stabilizers against oxidation, heat, light or UV radiation;
flame-retardant substances;
surface-active substances, especially wetting agents, leveling agents, deaerating agents or defoamers; and
biocides, for example algicides or fungicides.

In the epoxy resin composition, the ratio of the number of amine hydrogens reactive toward epoxy groups relative to the number of epoxy groups is preferably in the range from 0.7 to 1.5, especially 0.8 to 1.2.

The components of the epoxy resin composition are stored in separate containers. A suitable container for storage of the resin component or the hardener component is especially a vat, a hobbock, a bag, a bucket, a can, a cartridge or a tube. The components are storable, meaning that they can be stored prior to use for several months up to one year or longer, without any change in their respective properties to a degree of relevance to their use. For use of the epoxy resin composition, the resin component and the hardener component and any filler component present are mixed with one another shortly before or during application. The mixing ratio between the components is preferably chosen such that the groups of the hardener component that are reactive toward epoxy groups are in a suitable ratio to the epoxy groups of the resin component, as described above. In parts by weight, the mixing ratio between the resin component and the hardener component is typically in the range from 1:10 to 10:1. especially 10:1 to 1:1.

The components are mixed by means of a suitable method. The mixing can be effected continuously or batchwise. If the mixing precedes the application, it must be ensured that not too much time passes between the mixing of the components and the application, since this can result in defects, for example slowed or incomplete buildup of adhesion. The mixing is especially effected at ambient temperature, which is typically within the range from about 0 to 40° C., preferably about 5 to 30° C.

Curing by chemical reaction begins on mixing of the components. The epoxy groups react with the amino groups bearing amine hydrogen and any further groups reactive toward epoxy groups that are present with ring opening to give amino alcohol units. Further epoxide groups react with one another in anionic polymerization. As a result of these reactions, the composition cures to give a crosslinked material. It is known to the person skilled in the art that primary amino groups are difunctional with respect to epoxy groups.

The curing is especially effected at ambient temperature. It typically extends over a few hours to days until it is substantially complete under the given conditions. Important influencing parameters here are the temperature, the stoichiometry and the presence of accelerators.

As a result of the curing reaction, a cured epoxy resin composition is obtained.

The invention thus further provides a cured epoxy resin composition obtained from the epoxy resin composition described after the mixing of the components and curing thereof.

The epoxy resin composition may be used as impregnation or injection resin, as potting compound, as mold resin or matrix resin for composites or circuit boards, as covering, protective coat or primer, or as adhesive for industrial manufacture, for example for rotor blades of wind turbines, aircraft fuselages, motor vehicle bodywork or electronic components, or particularly advantageously as adhesive on built structures.

The epoxy resin composition is preferably used as adhesive, especially as adhesive in the construction sector.

Preferably, the epoxy resin, when used as adhesive, comprises at least one thixotropic agent, especially at least one in situ thixotropic agent.

Preferably, the epoxy resin composition, when used as the adhesive, comprises at least one inorganic filler, especially a silicatic fillers such as, in particular, quartz flour, quartz sand, silicon carbide, wollastonite or mica.

Preferably, the epoxy resin composition, when used as adhesive, contains in the range from 1% to 90%, more preferably 20% to 90%, especially 50% to 90%, by weight of inorganic fillers.

In a preferred embodiment, the epoxy resin composition comprises at least 50% by weight of inorganic fillers. Such a composition is particularly suitable as adhesive, especially as what is called an adhesive mortar. Preferably, both the resin component and the hardener component contain inorganic fillers.

Preferably, the epoxy resin composition here comprises 50% to 90% by weight of inorganic fillers, where both the resin component and a hardener component, each on their own, contain 50% to 90% by weight of inorganic fillers.

Preferably, in this case, at least one quartz flour and/or at least one quartz sand is present.

In addition, such a composition preferably contains at least one further inorganic filler, especially a precipitated, fatty acid-coated calcium carbonate and/or a fumed silica. These can reduce the settling of the quartz filler in the components during the storage time.

After the components have been mixed, the epoxy resin composition has a liquid or pasty consistency.

When used as adhesive, the freshly mixed composition is applied within its open time to at least one of the substrates to be bonded and the two substrates are joined to form an adhesive bond within the open time of the composition. "Open time" refers here to the period of time between the mixing of the components and the juncture from which sufficient deformability of the adhesive and/or sufficient buildup of adhesion to the substrates is no longer assured.

The freshly mixed composition is applied especially by means of a brush, roll, spatula, doctor blade or trowel, or from a tube, cartridge or metering device.

The epoxy resin composition is preferably used at temperatures in the range from 0 to 100° C., preferably 5 to 80° C., especially 10 to 50° C., more preferably at ambient outdoor temperatures, in covered shelters or in buildings, preferably within the range from 0 to 40° C., especially 5 to 30° C.

The epoxy resin composition is particularly suitable as adhesive for uses in the construction industry, especially
  for the reinforcing of built structures by means of steam lamellas or lamellas of carbon fiber-reinforced composite plastics (CRP),
  for constructions containing adhesive-bonded finished concrete parts, especially bridges or concrete towers, for example for wind turbines, shafts, pipelines or tunnels, or for constructions containing adhesive-bonded natural rocks, ceramic elements or parts made of fiber cement, steel, cast iron, aluminum, wood or polyester,
  for the anchoring of anchor bolts or steel rods in boreholes,
  for the fixing of, for example, banisters, railings or doorframes,
  for repairs such as, in particular, the filling of edges, holes and joins in concrete restoration,
  for the adhesive bonding of films of polyvinyl chloride (PVC), flexibilized polyolefin (Combiflex®), adhesion-modified chlorosulfonated polyethylene (Hypalon®) on concrete or steel.

Further fields of use relate to structural bonding in the construction or manufacturing industry, especially as adhesive mortar, assembly adhesive, reinforcement adhesive such as, in particular, for the bonding of lamellas of CRP or steel to concrete, brickwork or wood, as element adhesive, for example for bridge elements, sandwich element adhesive, facade element adhesive, reinforcing adhesive, bodywork adhesive or half-shell adhesive for rotor blades of wind turbines.

The composition is likewise suitable for the filling of cavities such as fissures, cracks or drillholes, wherein the composition is filled or injected into the cavity and fills it after curing, and bonds or sticks the flanks of the cavity to one another in a force-fitting manner.

The composition is particularly suitable for applications in which strength is to be built up rapidly at low temperatures, especially within the range from 0 to 10° C., for example in the assembly of bridges or other outdoor structures.

It is also particularly suitable for applications in which a particularly high compressive strength is to be achieved, especially as adhesive mortar for the joining of concrete elements to one another to form tower-like constructions, and a composition having very high compressive strength is especially suitable for the bonding of elements made of high-strength concrete.

The epoxy resin composition is especially used in a method of adhesive bonding comprising the steps of
  mixing the components by a suitable method and either
    applying the mixed composition to at least one of the substrates to be bonded,
    joining the substrates to give an adhesive bond within the open time of the composition,
  or
    applying the mixed composition to a cavity or gap between two substrates,
    optionally inserting an anchor into the cavity or gap within the open time of the composition,
  followed by the curing of the composition.

An "anchor" refers here more particularly to a rebar, a threaded rod or a bolt. An anchor is especially adhesive-bonded or anchored in a wall, roof or foundation in such a way that a portion thereof is bonded in a force-fitting manner and a portion thereof protrudes and can be subjected to a construction load.

The composition is preferably applied and cured at ambient temperature, especially at a temperature in the range from 0 to 40° C., especially 5 to 30° C. This enables particularly simple handling of the composition or adhesive and is especially advantageous outdoors, on construction sites and in unheated industrial halls.

The mixed composition is applied to at least one substrate, the following substrates being particularly suitable:
  glass, glass ceramic, concrete, mortar, cement screed, anhydrite screed, magnesia screed, brick, tile, gypsum and natural rocks such as granite or marble;
  metals or alloys such as aluminum, iron, steel and non-ferrous metals, or surface-finished metals or alloys such as galvanized or chromed metals;
  wood, woodbase materials bonded with resins, for example phenolic, melamine or epoxy resins, or further polymer composites; or
  polymers, especially rigid or flexible PVC, ABS, polycarbonate (PC), polyamide (PA), polyesters, PMMA, epoxy resins, PUR, POM, PO, PE, PP, EPM or EPDM, where the polymers have optionally been surface-treated by means of plasma, corona or flames;
  fiber-reinforced plastics, such as carbon fiber-reinforced composite plastics (CRP), glass fiber-reinforced plastics (GRP) or sheet molding compounds (SMC);
  coated substrates such as powder-coated metals or alloys;
  paints or varnishes.

The substrates can be pretreated if required prior to the application of the composition. Pretreatments of this kind especially include physical and/or chemical cleaning methods, for example sanding, sandblasting, shotblasting, brushing and/or blowing, and also treatment with detergents or solvents, or the application of an adhesion promoter, an adhesion promoter solution or a primer.

Porous mineral substrates are preferably pretreated such that there is an open-pore, largely dust-free surface without a cement skin. Use as adhesive gives rise to an adhesive-bonded article. This is especially a building, a bathroom, a kitchen, a stairway, a roof, a balcony, a terrace, a parking deck, a bridge, a shaft, a pipeline, a tunnel, a sandwich element of a structure constructed by lightweight construction, a solar panel such as a photovoltaic or solar thermal module, a facade, a domestic appliance, a rotor blade of a wind turbine, a concrete tower, an automobile, a bus, a truck, a rail vehicle, a ship, a helicopter, or an installable component thereof.

The invention thus further provides an adhesive-bonded article obtained from the use of the composition in the described method of adhesive bonding.

The epoxy resin composition is notable for a rapid buildup of strength, a high final strength and high bonding forces.

More particularly, the epoxy resin composition, when cured at room temperature, attains a tensile strength after 2 days, determined as described in the examples, of at least 25 MPa, especially at least 30 MPa.

More particularly, the epoxy resin composition, when cured at 5° C., attains a tensile strength after 3 days, determined as described in the examples, of at least 25 MPa.

More preferably, the epoxy resin composition is used for production of adhesive bond having a compressive strength of at least 120 MPa, preferably at least 125 MPa, more preferably at least 130 MPa, determined to ASTM D695 on specimen is cured at room temperature 7 days at a testing speed of 1.3 mm/min as described in the examples which follow. This adhesive bond is preferably a constituent of a concrete tower of a wind turbine. The epoxy resin composition preferably comprises 3-(3-(dimethylamino)propylamino)propylamine (DMAPAPA) in the hardener component.

EXAMPLES

Working examples are adduced hereinafter, which are intended to elucidate the invention described in detail. It will be appreciated that the invention is not restricted to these described working examples.

"AHEW" stands for amine hydrogen equivalent weight.
"EEW" stands for epoxy equivalent weight.
"Standard conditions" refer to a temperature of 23±1° C. and a relative air humidity of 50±5%. "SC" stands for "standard conditions".

Viscosity was measured with a thermostated Rheotec RC30 cone-plate viscometer (cone diameter 50 mm, cone angle 1°, cone tip-plate distance 0.05 mm) at a shear rate of 10 $s^{-1}$.

Commercial Substances Used:
BA-DGE: bisphenol A diglycidyl ether, EEW about 190 g/eq (Araldite® GY 250, from Huntsman).
BuD-DGE: butane-1,4-diol diglycidyl ether, EEW about 122 g/eq (Araldite® DY-D, from Huntsman).
D.E.N.® 438: epoxy novolak resin (phenol novolak glycidyl ether), EEW about 180 g/eq, functionality 3.6 (from Olin)
Solvesso: solvent based on aromatic hydrocarbons (Solvesso® 150 ND, from ExxonMobil).
BHMT-HP: bis(6-aminohexyl)amine with a purity in the region of about 98% by weight, AHEW about 43 g/eq (Dytek® BHMT-HP from Invista)
BHMT-(50-78%): technical grade quality of bis(6-aminohexyl)amine with a purity in the range from 50% to 78% by weight, AHEW about 48 g/eq (Dytek® BHMT Amine (50-78%), from Invista)
DMAPAPA: 3-(3-(dimethylamino)propylamino)propylamine, AHEW 53 g/eq (DMAPAPA, from Arkema).
TETA: triethylenetetramine, AHEW about 27 g/eq (technical grade, from Huntsman)
Quartz flour: grain size 0 to 75 μm
Quartz sand: grain size 0.1 to 0.3 mm Preparation of Adducts:
Adduct A-1:
An initial charge of 77.5 g of BHMT-(50-78%) under a nitrogen atmosphere was heated to 80° C. While stirring, 22.5 g of D.E.N.® 438 preheated to 100° C. were added gradually, while keeping the temperature of the reaction mixture between 80 and 100° C. by cooling. The reaction mixture was then left at 80 to 100° C. for 1 hour and then cooled down to room temperature. A dark-colored liquid having a viscosity at 25° C. of 19.8 Pa·s and a theoretical AHEW of 67.1 g/eq was obtained.

Adduct A-2 (Ref.):
An initial charge of 76.3 g of BHMT-HP under a nitrogen atmosphere was heated to 80° C. While stirring, 22.5 g of D.E.N.® 438 preheated to 100° C. were added gradually, while keeping the temperature of the reaction mixture between 80 and 100° C. by cooling. The reaction mixture was then left at 80 to 100° C. for 1 hour and then cooled down to room temperature. A clear, yellowish liquid having a viscosity at 25° C. of 1.4 Pa·s and a theoretical AHEW of 60.8 g/eq was obtained.

Adduct A-3 (Ref.):
An initial charge of 69.4 g of TETA under a nitrogen atmosphere was heated to 80° C. While stirring, 30.6 g of D.E.N.® 438 preheated to 100° C. were added gradually, while keeping the temperature of the reaction mixture between 80 and 100° C. by cooling. The reaction mixture was then left at 70 to 90° C. for 1 hour and then cooled down to room temperature. A clear, yellowish liquid having a viscosity at 25° C. of 6.9 Pa·s and a theoretical AHEW of 41.7 g/eq was obtained.

Adduct A-4 (Ref.):
An initial charge of 77.5 g of BHMT-(50-78%) under a nitrogen atmosphere was heated to 80° C. While stirring, 22.5 g of BA-DGE preheated to 60° C. were added gradually, while keeping the temperature of the reaction mixture between 60 and 90° C. by cooling. The reaction mixture was then left at 70 to 90° C. for 1 hour and then cooled down to room temperature. A dark-colored liquid having a viscosity at 25° C. of 8.8 Pa·s and a theoretical AHEW of 67.1 g/eq was obtained.

Adduct A-1 is an inventive adduct AD. Adducts A-2, A-3 and A-4 are comparative examples and are labeled "(Ref.)".

Preparation of Hardeners:
Hardener H-1 to H-7
For each hardener, the adduct specified in table 1 and the ingredients specified in table 1 were mixed in the specified amounts (in parts by weight) by means of a centrifugal mixer (SpeedMixer™ DAC 150, FlackTek Inc.) and stored with exclusion of moisture.

The storage stability of each hardener at 5° C. and the viscosity at 25° C. were determined.

Storage stability at 5° C. was determined by storing the hardener in a closed glass container at 5° C. for 14 days and then making a visual assessment. If the hardener consisted of a homogeneous liquid, storage stability was answered "yes", otherwise "no". In the case of the unstable hardeners tested, complete or partial solidification was observed in each case.

The calculated AHEW, the viscosity and the storage stability at 5° C. of the hardeners prepared are reported in table 1.

The hardeners labeled "(Ref.)" are comparative examples.

TABLE 1

Composition, AHEW and viscosity of the hardeners H-1 to H-7.

| | Hardener | | | | | | |
|---|---|---|---|---|---|---|---|
| | H-1 | H-2 (Ref.) | H-3 (Ref.) | H-4 (Ref.) | H-5 | H-6 (Ref.) | H-7 (Ref.) |
| Adduct | A-1 70.0 | A-2 70.0 | A-3 65.0 | A-4 70 | A-1 80.0 | A-2 80.0 | A-3 80.0 |
| DMAPAPA | 30.0 | 30.0 | 35.0 | 30.0 | — | — | — |
| TETA | — | — | — | — | 20.0 | 20.0 | 20.0 |
| AHEW [g/eq] | 62.1 | 58.3 | 45.1 | 62.0 | 51.7 | 48.7 | 37.6 |
| Viscosity (25° C.) [Pa · s] | 0.57 | 0.20 | 0.36 | 0.37 | 1.47 | 0.53 | 1.75 |
| Storage stability at 5° C. | yes | yes | yes | yes | yes | no[1] | yes |

[1] partly solid

Production of Epoxy Resin Adhesives:

Examples 1 to 8

For each example, a resin component (Resin comp.) was produced by mixing the ingredients of the resin component specified in table 2 in the specified amounts (in parts by weight) by means of a centrifugal mixer (SpeedMixer™ DAC 150, FlackTek Inc.) and storing it with exclusion of moisture.

In addition, for each example, a hardener component (Hardener comp.) was prepared by mixing the adducts specified in table 2 and the further ingredients of the hardener component in the amounts specified (in parts by weight) by means of the centrifugal mixer and storing it with exclusion of moisture. For each example, the resin and the hardener component were then processed by means of the centrifugal mixer to give a homogeneous paste and this was immediately tested as follows:

Mechanical properties were tested by applying and curing the mixed adhesive under standard climatic conditions to a silicone mold to give dumbbell-shaped specimens having a thickness of 10 mm and a length of 150 mm with a gage length of 80 mm and a gage width of 10 mm. Some tensile specimens were removed from the mold after a curing time of 2 days and further tensile specimens after 7 days, and these were used to determine tensile strength and elongation at break (2d SCC) and (7d SCC) to EN ISO 527 at a strain rate of 1 mm/min. Further such tensile specimens were produced by cooling the components to 5° C. prior to the mixing, then mixing them, applying them to give tensile specimens and curing them at 5° and about 70% relative air humidity. After 3 days, the tensile specimens were removed from the mold and tested as described for tensile strength and elongation at break (3d 5° C.). Compressive strength (2d SCC; 7d SCC) was determined by applying the mixed adhesive under standard climatic conditions to a silicone mold to give cuboids of dimensions 12.7×12.7×25.4 mm and allowing them to cure under standard climatic conditions. After 2 and after 7 days, several cuboids in each case were removed from the mold and compressed to destruction as per ASTM D695 at a testing speed of 1.3 mm/min, reading off the compressive strength value at the maximum force in each case. Further such cuboids were produced by cooling the components to 5° C. prior to the mixing, then mixing them, applying them to cuboids and curing them at 5° C. and about 70% relative air humidity. After 7 days, some of the cuboids were removed from the mold and tested as described for compressive strength (7d 5° C.), while further cuboids were additionally stored under standard climatic conditions for 7 days and only then removed from the mold and tested as described for compressive strength (7d 5° C.+7d SCC). A great deviation between the value after 7d 5° C.+7d SCC and the value after 7d SCC is a sign of curing defects under cold conditions.

Lap shear strength on steel (LSS steel) was measured by producing multiple adhesive bonds, wherein the mixed adhesive was applied between two heptane-degreased steel sheets in a layer thickness of 0.5 mm with an overlapping bonding area of 10×25 mm. After a storage time of 7 days under standard climatic conditions, lap shear strength was determined to DIN EN 1465 at a strain rate of 10 mm/min.

Lap shear strength on carbon fiber composite (CRP) (LSS CRP) was measured by producing multiple adhesive bonds, wherein the mixed adhesive was applied between two heptane-degreased Sika® CarboDur® S512 lamellas in a layer thickness of 0.5 mm with an overlapping bonding area of 10×50 mm. After a storage time of 7 days under standard climatic conditions, lap shear strength was determined as described.

To measure adhesive bond strength between concrete and steel (Bond strength), multiple adhesive bonds were produced by applying a few grams of the mixed adhesive in each case to a concrete plate that has been cleaned by means of a steel brush and bonding an acetone-clean steel cylinder having a diameter of 20 mm above its base area, with a thickness of the adhesive bond of 2 mm. The bonds were stored under standard climatic conditions. After 7 days, they were pulled apart until fracture in accordance with DIN EN 4624 at a testing speed of 2 mm/min in order to determine the strength of the adhesive bond at the maximum force.

Tg (glass transition temperature) was determined by means of DSC on cured adhesive samples that had been stored under standard climatic conditions for 7 days with a Mettler Toledo DSC 3+700 instrument and the following measurement program: (1) −10° C. for 2 min, (2) −10 to 200° C. at a heating rate of 10 K/min (=1st run), (3) 200 to −10° C. at a cooling rate of −50 K/min, (4) −10° C. for 2 min, (5) −10 to 180° C. at a heating rate of 10 K/min (=2nd run).

The results are reported in table 2.

The examples labeled "(Ref.)" are comparative examples.

TABLE 2

Composition and properties of examples 1 to 8.

| | Example | | | | | | | |
|---|---|---|---|---|---|---|---|---|
| | 1 | 2 (Ref.) | 3 (Ref.) | 4 (Ref.) | 5 (Ref.) | 6 | 7 (Ref.) | 8 (Ref.) |
| Resin comp. | | | | | | | | |
| BA-DGE | 59.9 | 60.8 | 64.3 | 59.9 | 52.4 | 62.5 | 63.3 | 66.5 |
| D.E.N. ® 438 | — | — | — | — | 7.5 | — | — | — |
| BuD-DGE | 11.2 | 11.4 | 12.1 | 11.2 | 11.2 | 11.7 | 11.9 | 12.5 |
| Solvesso | 3.8 | 3.8 | 4.0 | 3.8 | 3.8 | 3.8 | 4.0 | 4.1 |
| Quartz flour | 130.0 | 130.0 | 130.0 | 130.0 | 130.0 | 130.0 | 130.0 | 130.0 |
| Quartz sand | 100.0 | 100.0 | 100.0 | 100.0 | 100.0 | 100.0 | 100.0 | 100.0 |
| Hardener comp. | | | | | | | | |
| Adduct | A1 | A2 | A3 | A4 | A4 | A1 | A2 | A3 |
| | 17.6 | 16.8 | 12.7 | 17.6 | 17.6 | 17.5 | 16.6 | 13.5 |
| DMAPAPA | 7.5 | 7.2 | 6.9 | 7.5 | 7.5 | — | — | — |
| TETA | — | — | — | — | — | 4.4 | 4.2 | 3.4 |
| Quartz flour | 20.0 | 20.0 | 20.0 | 20.0 | 20.0 | 20.0 | 20.0 | 20.0 |
| Quartz sand | 50.0 | 50.0 | 50.0 | 50.0 | 50.0 | 50.0 | 50.0 | 50.0 |
| Tensile strength: | | | | | | | | |
| (2 d SCC) [MPa] | 31 | 27 | n.d. | 23 | 19 | 32 | 28 | 24 |
| (7 d SCC) [MPa] | 34 | 28 | 24 | 24 | 26 | 32 | 29 | 26 |
| (3 d 5° C.) [MPa] | 26 | 25 | n.d. | 13 | 18 | n.d. | n.d. | n.d. |
| Elongation at break: | | | | | | | | |
| (2 d SCC) | 0.2% | 0.2% | n.d. | 0.2% | 0.2% | 0.2% | 0.2% | 0.2% |
| (7 d SCC) | 0.2% | 0.2% | 0.2% | 0.2% | 0.2% | 0.2% | 0.2% | 0.2% |
| (3 d 5° C.) | 0.3% | 0.5% | n.d. | 0.2% | 0.2% | n.d. | n.d. | n.d. |
| Compressive strength | | | | | | | | |
| [MPa] (2 d SCC) | 131 | 121 | 131 | n.d. | n.d. | 104 | 103 | n.d. |
| (7 d SCC) | 138 | 134 | 134 | n.d. | n.d. | 116 | 109 | n.d. |
| (7 d 5° C.) | 115 | 101 | 101 | n.d. | n.d. | n.d. | n.d. | n.d. |
| (7 d 5° C. + 7 d SCC) | 133 | 112 | 118 | n.d. | n.d. | n.d. | n.d. | n.d. |
| LSS steel [MPa] | 10.1 | 8.1 | 9.3 | 8.6 | 9.4 | 4.8 | 2.8 | 4.0 |
| LSS CRP [MPa] | 10.6 | 15.3 | 7.6 | 9.5 | 7.7 | n.d. | n.d. | n.d. |
| Bond strength [MPa] | 24.1 | 17.7 | n.d. | 18.1 | 22.8 | 14.4 | 11.4 | 12.0 |
| Tg 1st/2nd run [° C.] | 58/73 | 59/93 | 63/79 | 54/67 | 55/69 | 51/73 | 52/74 | 53/91 |

"n.d." stands for "not determined"

The invention claimed is:

1. An epoxy resin composition comprising:
   at least 50% by weight of inorganic fillers,
   a resin component comprising at least one epoxy resin, and
   a hardener component comprising an adduct AD that is obtained from a reaction of
      at least one novolak glycidyl ether containing an average of 2.5 to 4 epoxy groups per molecule with
      an amine mixture comprising bis(6-aminohexyl)amine and at least one amine A1 other than bis(6-aminohexyl)amine, the at least one amine A1 having at least one primary amino group.

2. The epoxy resin composition as claimed in claim 1, wherein the at least one novolak glycidyl ether is a phenol novolak glycidyl ether.

3. The epoxy resin composition as claimed in claim 1, wherein the amine mixture contains from 25% to 82% by weight of bis(6-aminohexyl)amine and from 15% to 75% by weight of the at least one amine A1.

4. The epoxy resin composition as claimed in claim 3, wherein the amine mixture contains from 50% to 78% by weight of bis(6-aminohexyl)amine.

5. The epoxy resin composition as claimed in claim 3, wherein the amine mixture contains from 20% to 50% by weight of the at least one amine A1.

6. The epoxy resin composition as claimed in claim 1, wherein the at least one amine A1 is selected from the group consisting of hexamethylene-1,6-diamine, higher oligomers of hexamethylene-1,6-diamine, 6-aminocapronitrile, and 6-aminocaproamide.

7. The epoxy resin composition as claimed in claim 1, wherein, in the reaction, the primary amino groups of the amine mixture are present in a stoichiometric excess over the epoxy groups of the at least one novolak glycidyl ether.

8. The epoxy resin composition as claimed in claim 1, wherein the amine mixture is initially charged and the at least one novolak glycidyl ether is mixed in, where the reaction is conducted at a temperature in a range of from 60 to 140° C. and without solvent or thinner.

9. The epoxy resin composition as claimed in claim 1, wherein the hardener further comprises at least one further amine A2 other than bis(6-aminohexyl)amine, the at least one further amine A2 having at least two amine hydrogens reactive toward epoxy groups per molecule.

10. The epoxy resin composition as claimed in claim 9, wherein the at least one further amine A2 is selected from the group consisting of 2,2(4),4-trimethylhexamethylenediamine, triethylenetetramine, tetraethylenepentamine, pentaethylenehexamine, hexaethyleneheptamine, N,N'-bis(3-aminopropyl)ethylenediamine, 1-amino-3-aminomethyl-3,5,5-trimethylcyclohexane, 1,3-bis(aminomethyl)cyclohexane, 1,4-bis(aminomethyl)cyclohexane, 1,3-bis(aminomethyl) benzene, polyoxyalkylenedi- and -triamines having an average molecular weight in the range from 200 to 500 g/mol and and 3-(3-(dimethylamino)propylamino)propylamine.

11. The epoxy resin composition as claimed in claim 9, wherein a content of the adduct AD in hardener is in a range of from 20% to 80% by weight based on the compounds reactive with epoxy groups that are present in the hardener.

12. The epoxy resin composition as claimed in claim 11, wherein a content of the at least one further amine A2 in hardener is in a range of from 10% to 70% by weight based on the compounds reactive with epoxy groups that are present in the hardener.

13. The epoxy resin composition as claimed in claim 9, wherein the at least one further amine A2 includes 3-(3-(dimethylamino)propylamino)propylamine.

14. A cured epoxy resin composition obtained by:
mixing the components of the epoxy resin composition as claimed in claim 1, and
curing thereof.

15. A method comprising applying the epoxy resin composition as claimed in claim 1 in a method of adhesive bonding, comprising
mixing the components by a suitable method and either
applying the mixed composition to at least one of the substrates to be bonded,
joining the substrates to give an adhesive bond within the open time of the mixed composition, or
applying the mixed composition to a cavity or gap between two substrates,
optionally inserting an anchor into the cavity or gap within the open time of the mixed composition,
followed by curing the mixed composition.

16. An adhesive-bonded article obtained from the method as claimed in claim 15.

17. The epoxy resin composition as claimed in claim 1, wherein the inorganic fillers are present in both the resin component and the hardener component.

18. The epoxy resin composition as claimed in claim 1, comprising from 50% to 90% by weight of the inorganic fillers.

19. The epoxy resin composition as claimed in claim 1, wherein the inorganic fillers include at least one selected from the group consisting of quartz flour, quartz sand, silicon carbide, wollastonite, mica, a precipitated, fatty acid-coated calcium carbonate, and fumed silica.

* * * * *